United States Patent
Tiwari

(10) Patent No.: US 11,461,210 B2
(45) Date of Patent: Oct. 4, 2022

(54) REAL-TIME CALCULATION OF DATA CENTER POWER USAGE EFFECTIVENESS

(71) Applicant: Kyndryl, Inc., New York, NY (US)

(72) Inventor: Awadesh Tiwari, Bangalore (IN)

(73) Assignee: Kyndryl, Inc., New York, NY (US)

( * ) Notice: Subject to any disclaimer, the term of this patent is extended or adjusted under 35 U.S.C. 154(b) by 574 days.

(21) Appl. No.: 16/453,072

(22) Filed: Jun. 26, 2019

(65) Prior Publication Data
US 2020/0409814 A1 Dec. 31, 2020

(51) Int. Cl.
| | | |
|---|---|---|
| G06F 11/30 | (2006.01) | |
| G06F 3/04847 | (2022.01) | |
| G06F 1/28 | (2006.01) | |
| G06Q 10/04 | (2012.01) | |
| G06Q 10/06 | (2012.01) | |
| G06F 11/34 | (2006.01) | |

(52) U.S. Cl.
CPC ........... *G06F 11/3062* (2013.01); *G06F 1/28* (2013.01); *G06F 3/04847* (2013.01); *G06F 11/3442* (2013.01); *G06F 11/3452* (2013.01); *G06Q 10/04* (2013.01); *G06Q 10/06315* (2013.01)

(58) Field of Classification Search
CPC .... G06F 1/28; G06F 11/3062; G06F 11/3442; G06F 11/3452; G06F 3/04847; G06Q 10/04; G06Q 10/06315
USPC .......................................................... 702/61
See application file for complete search history.

(56) References Cited

U.S. PATENT DOCUMENTS

| | | | |
|---|---|---|---|
| 8,401,833 B2* | 3/2013 | Radibratovic | G06Q 10/04 703/13 |
| 9,679,087 B2 | 6/2017 | Hamann | |
| 9,917,704 B2 | 3/2018 | Zhang | |
| 2010/0049494 A1* | 2/2010 | Radibratovic | G06Q 10/04 703/13 |
| 2015/0261898 A1 | 9/2015 | Gupta | |
| 2016/0140468 A1 | 5/2016 | Langborg-Hansen | |

FOREIGN PATENT DOCUMENTS

WO      2018137402 A1      8/2018

OTHER PUBLICATIONS

Dayarathna, et al,. "Data Center Energy Consumption Modeling: A Survey", IEEE Communications Surveys & Tutorials, vol. 18, No. 1, First Quarter 2016, pp. 732-794, <https://ieeexplore.ieee.org/abstract/document/7279063>.

Gao, Jim, "Machine Learning Applications for Data Center Optimization", Google, Last printed Apr. 11, 2019, pp. 1-13, <https://storage.googleapis.com/pub-tools-public-publication-data/pdf/42542.pdf>.

(Continued)

*Primary Examiner* — John H Le
(74) *Attorney, Agent, or Firm* — Kenneth Han; George S. Blasiak; Heslin Rothenberg Farley & Mesiti PC

(57) ABSTRACT

A method, system and computer program product for calculating power usage effectiveness (PUE) in a data center generate, based on a historical data of the data center, a template for each data center parameter of a plurality of data center parameters and uses the generated template to calculate an expected value of each data center parameter that can be subsequently used to compute and optimize the power usage effectiveness in the data center.

20 Claims, 7 Drawing Sheets

(56) References Cited

OTHER PUBLICATIONS

Mell et al., "The NIST Definition of Cloud Computing", National Institute of Standards and Technology, Special Publication 800-145, Sep. 2011, 7 pages.

Ruiz, Jose, "Better information leads to better decisions", The Calibrated Data Center: Using Predictive Modeling, UptimeInstitute, Jun. 2015, 24 pages, <https://journal.uptimeinstitute.com/the-calibrated-data-center-using-predictive-modeling/>.

* cited by examiner

REAL-TIME CALCULATION OF DATA CENTER POWER USAGE EFFECTIVENESS

BACKGROUND

The present invention generally relates to the field of power usage in data center facilities, and more particularly to a method, computer system and computer program product for calculating and optimizing power usage effectiveness (PUE) within a data center using predictive analytic tools.

A data center often includes servers, power supply equipment, lights, office equipment, miscellaneous equipment, and cooling equipment (collectively equipment components). Power supply equipment may include uninterruptible power supply (UPS) equipment, batteries, and power generators. Cooling equipment may include cooling towers, chillers, computer room air conditioners (CRAC), and the like. In general, a data center is designed to provide some number of kilowatts for the critical load, i.e., the electrically powered critical equipment can consume no more than the provided power. However, energy consumption of data center facilities has significantly increased in recent years, mainly because of current computing demands.

In an effort to improve data center energy efficiency different metrics have been introduced to assist data center operators in gauging the energy efficiency of the facility. Nowadays, a metric called Power Usage Effectiveness (PUE) is widely used by data center operators. PUE is defined as Total Facility Power/Information Technology (IT) Equipment Power. In consequence, it is important for data center operators to accurately calculate and optimize PUE values. Current PUE calculation and optimization approaches typically rely on fixed energy losses, power-in, and IT loads, thereby ignoring system dynamics, dependencies on internal stability and system controls. Therefore, current PUE calculation approaches lack real-time insights and recommendations on how to reduce PUE penalties and optimize PUE incentives.

SUMMARY

According to an embodiment of the present disclosure a method for calculating power usage effectiveness (PUE) in a data center includes generating a template for each data center parameter of a plurality of data center parameters based on a historical data of the data center, based on the generated template calculating an expected value of each data center parameter, and based on the expected value of each data center parameter, computing a power usage effectiveness associated with the data center.

Another embodiment of the present disclosure provides a computer program product for calculating power usage effectiveness in a data center, based on the method described above.

Another embodiment of the present disclosure provides a computer system for calculating power usage effectiveness in a data center, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
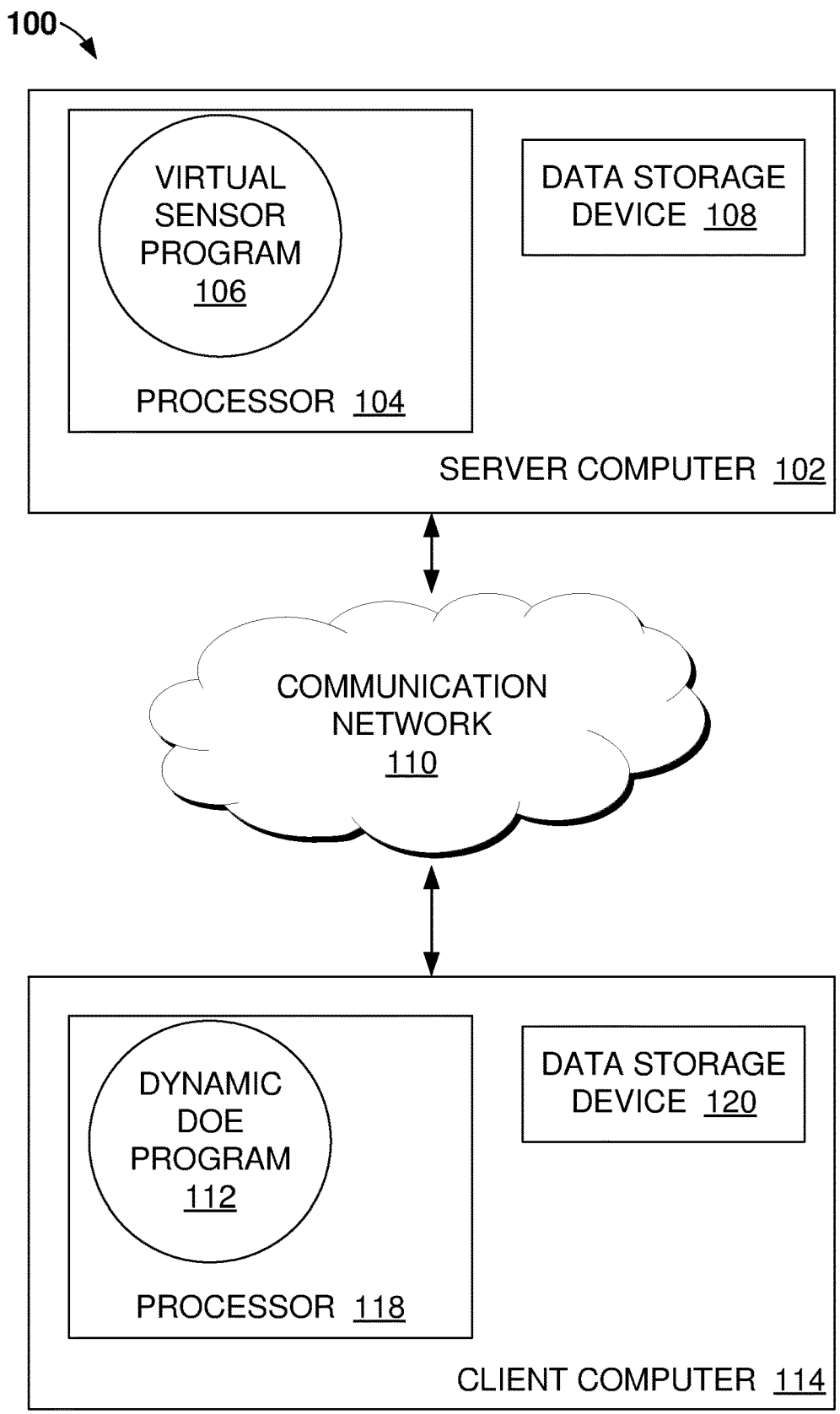
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Typically, data center users want to ensure their facilities are as energy efficient as financially sensible. The industry accepted metric used for quantifying efficiency is Power Usage Effectiveness (PUE). PUE is defined as Total Facility Power/Information Technology (IT) Equipment Power. As such, a value approaching 1.0 would indicate 100% efficiency. However, achieving a PUE value of 1 is particularly challenging. This typically results in companies being penalized for missing target PUE value in data centers as well as building management systems. Specifically, companies may have to pay for operating at PUE values that are larger than those specified in a Service Level Agreement (SLA). An SLA means any oral or written agreement between provider and user. For example, an SLA may include, but is not limited to, an agreement between vendor and customer, and an agreement between an information technology department and an end user. The SLA may involve one or more applications, and might include specifications regarding energy usage, availability, response times or problem-solving.

Further, power companies and energy regulation agencies typically offer incentives for the reduction of energy usage within data centers (e.g., PUE incentives) through cost-effective energy efficiency measures. However, current approaches to optimize PUE, and hence reduce energy consumption penalties, typically rely on fixed energy losses, power-in, and IT load to compute power usage effectiveness. Thus, ignoring system dynamics and dependencies on internal stability and system controls. Additionally, current PUE calculation approaches do not provide real-time insights or recommendations on how to reduce PUE penalties and optimize PUE incentives.

Embodiments of the present invention generally relates to the field of power usage in data center facilities, and more particularly to a method, computer system and computer program product for calculating and optimizing power usage effectiveness (PUE) within a data center using predictive analytics tools. The following described exemplary embodiments provide a system, method, and computer program product to, among other things, identify a plurality of parameters required to compute data power usage effectiveness at various loads within a data center, determine, using a dynamic design of experiments approach, the largest number of possible combinations of the identified parameters and generate an optimal curve of power utilization incentives versus power utilization misses at each operational point based on which data center parameters can be automatically adjusted to optimize, in a real-time fashion, the power usage effectiveness and reduce associated penalties. Therefore, the present embodiments have the capacity to improve the technical field of power usage in data center facilities by managing data center operations cognitively using calibratable and dynamic curves developed from real-time estimation of power utilization incentives and power utilization misses.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a server computer 102 with a processor 104 and a data storage device 108 that is enabled to run a virtual sensor program 106. Although not depicted in FIG. 1, the server computer 102 is associated with various components of a data center facility (e.g., power distribution units, cooling distribution units, etc.). In some embodiments, server computer 102 may be a resource management server, a web server or any other electronic device capable of receiving and sending data. In another embodiment, server computer 102 may represent a server computing system utilizing multiple computers as a server system, such as in a cloud computing environment.

The networked computer environment 100 may also include a client computer 114 and a communication network 110. The client computer 114 may include a processor 118 and a data storage device 120 that is enabled to run a dynamic design of experiments (DOE) program 112. Client computer 114 may be, for example, a mobile device, a telephone (including smartphones), a personal digital assistant, a netbook, a laptop computer, a tablet computer, a desktop computer, or any type of computing devices capable of accessing a network. The virtual sensing program 106 running on server computer 102 may communicate with the dynamic DOE program 112 running on client computer 114 via the communication network 110. As will be discussed with reference to FIG. 4, server computer 102 and client computer 114 may include internal components and external components.

The networked computer environment 100 may include a plurality of server computers 102 and client computers 114, only one of which is shown. The communication network 110 may include various types of communication networks, such as a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between server computer 102 and client computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
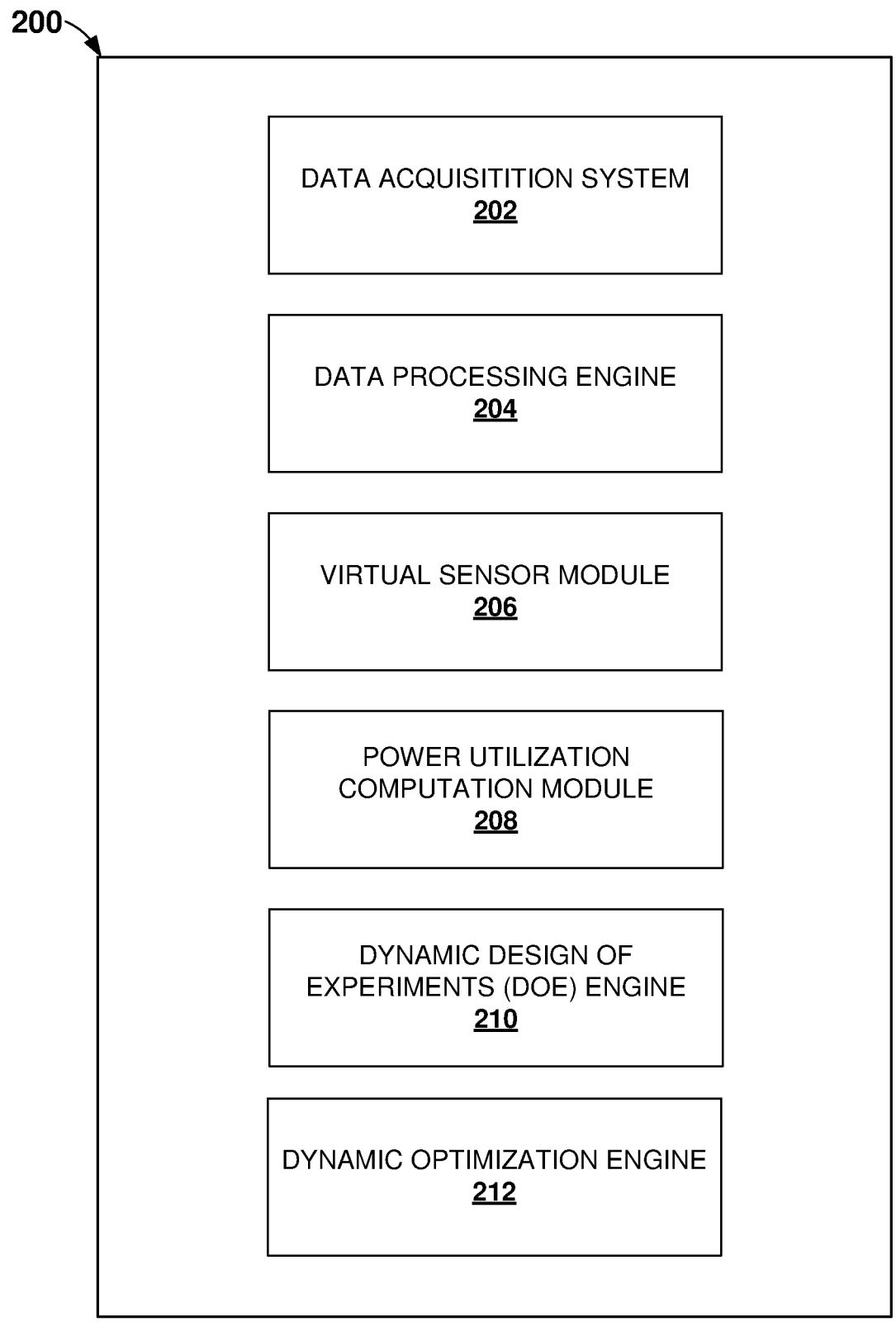
FIG. 2 is an exemplary diagram illustrating components of the proposed system for calculating and optimizing power usage effectiveness within a data center, according to an embodiment of the present disclosure.

Referring now to FIG. 2, an exemplary diagram illustrating components of the proposed system for calculating and optimizing power usage effectiveness within a data center is shown, according to an embodiment of the present disclosure. FIG. 2 provides only an illustration of one embodiment and does not imply any limitations with regard to the number of system components in which different embodiments may be implemented. In this embodiment, the system for calculating and optimizing power usage effectiveness within a data center includes a data acquisition system 202, a data processing engine 204, a virtual sensor module 206, a power utilization computation module, a dynamic design of experiments (DOE) engine 210 and a dynamic optimization engine 212.

The data acquisition system 202 acquires all data available from sensors, events and reports in the data center facility. For example, chiller data, electrical data, precision air conditioning (PAC) and rack data, operation and maintenance (O&M) data, reliability data are obtained from available sensors and reports to be processed by the data processing engine 204. Different data center parameters are identified by the data processing engine 204 from the received sensor data. For example, a temperature value from a temperature sensor in a chiller outlet. In some embodiments, the data acquisition system 202 is, for example, a building management system.

The data processed by the data processing engine 204 is sent to the virtual sensor module 206 in which a plurality of data center parameters within the received data are correlated to generate at least one template or model for each data center parameter in the plurality of data center parameters. More specifically, the virtual sensor module 206 leverages historical data to create a model (also referred to as "template") of various critical sensors such as chiller temperature, air temperatures, uninterruptible power supply (UPS) load, etc. and generates estimates of these signals when sensors fail or do not exist in the data center.

According to an embodiment, the virtual sensor module 206 looks at, for example, chiller temperature, data center heat load, and ambient temperature to determine and learn the nature of the chiller temperature as a function of the data center heat load and ambient temperature. A non-linear multi-order framework can be used to train the virtual sensor module 206. By doing this, a generic model framework for characterizing data center components, such as the chiller temperature, can be generated and applied to other data center components including PAC, UPS battery, etc.

The power utilization computation module 208 receives (expected) sensor values from the virtual sensor module 206 to calculate the power utilization effectiveness (PUE) for the data center facility. The expected sensor values are derived from the generated templates in the virtual sensor module 206. Calculation of power utilization effectiveness (PUE) will be explained in detail below with reference to FIG. 3.

The dynamic design of experiments (DOE) engine 210 generates an optimal amount of possible combinations of data center parameters based on the generic model framework that characterizes the data center obtained in the virtual sensor module 206. Stated differently, based on the generated template(s) the DOE engine 210 produces an optimal number of (substantially all) possible combinations of data center parameters including, but not limited to, combinations of system degradations, combinations of losses, combinations of loads, etc. As known by those skilled in the art, design of experiments (DOE) is a data collection and analysis tool that deals with planning, conducting, analyzing, and interpreting controlled tests to evaluate factors that control the value of a parameter or group of parameters.

Using the combinations of data center parameters generated by the dynamic DOE engine 210, the dynamic optimization engine 212 computes an optimal value of power utilization total, an optimal value of power utilization incentives, and an optimal values of power utilization misses. The dynamic optimization engine 212 also computes optimal operations for the data center based on power utilization incentives versus a curve of power utilization misses. In an embodiment, the dynamic optimization engine 212 can act as a logic switch that allows deciding whether to perform PUE optimization or not based on a data distribution system (DDS) output. Calculations performed by the dynamic optimization engine 212 will be explained in detail below with reference to FIG. 3.

Figure 3A:
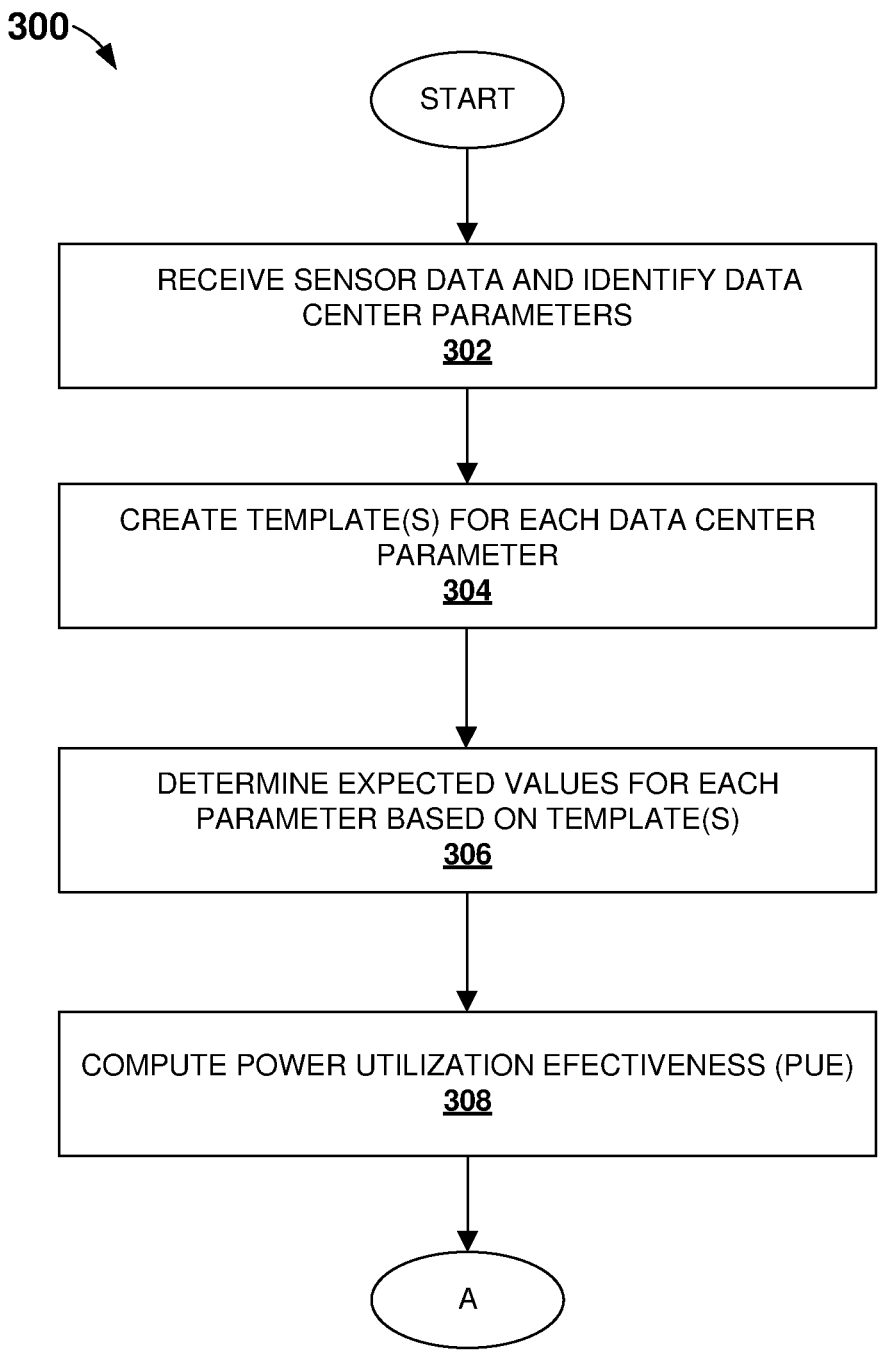
FIGS. 3A-3B is a flowchart illustrating a method for calculating and optimizing power usage effectiveness within a data center, according to an embodiment of the present disclosure.
Figure 3B:
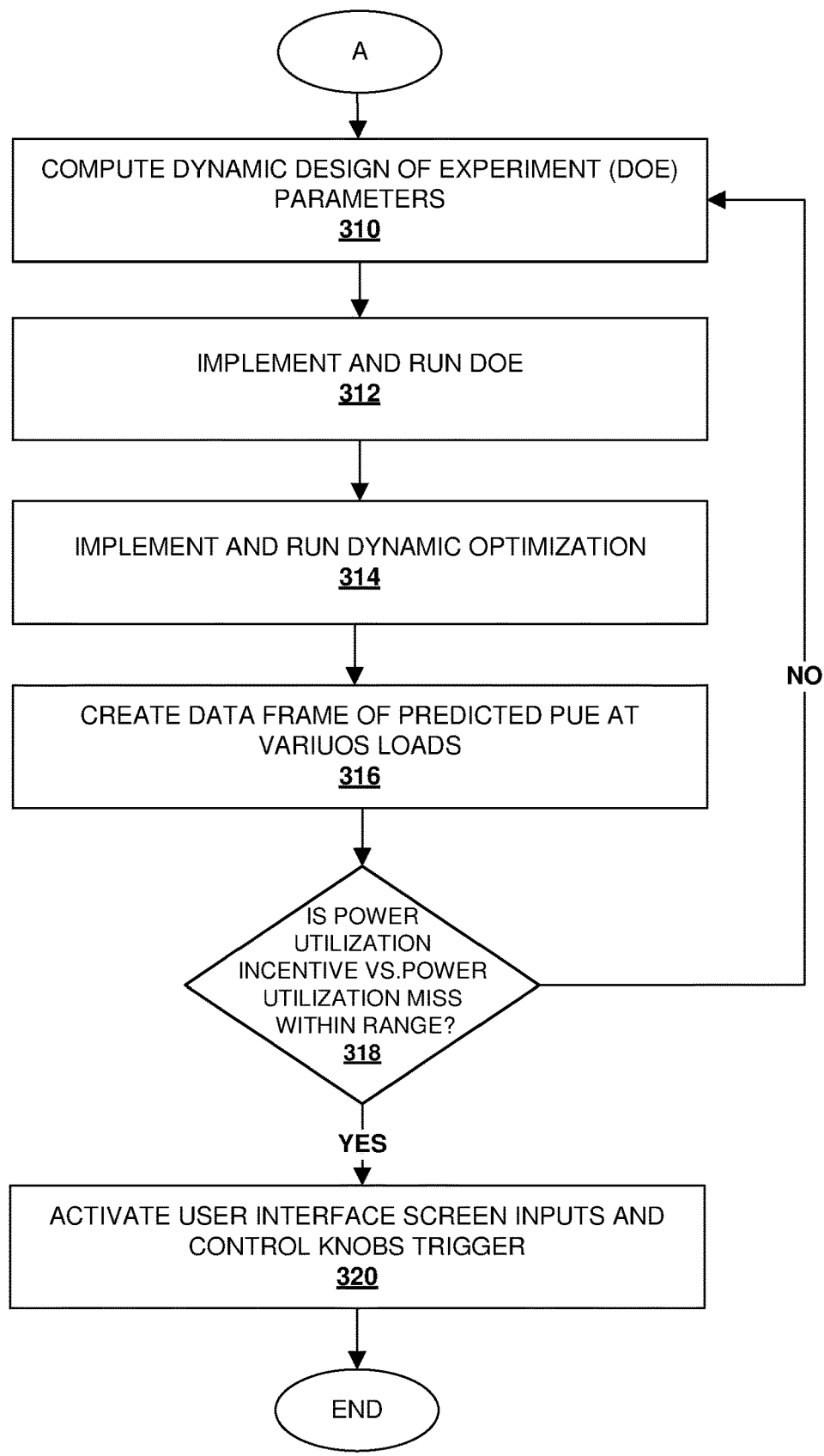

Referring now to FIGS. 3A-3B, a flowchart 300 illustrating a method for calculating and optimizing power usage effectiveness within a data center, according to an embodiment of the present disclosure.

The method starts at step 302 by invoking a data acquisition system such as the data acquisition system 202 in FIG. 2. As previously explained, the data acquisition system acquires all data available from sensors, events and reports. Typical data values obtained from data center sensors include temperature, pressure, power, set point, flow rates, energy, current drawn, and the like. The acquired data is sent to a data processing engine such as the data processing engine 204 of FIG. 2 and fed to a virtual sensor module (e.g., virtual sensor module 206 in FIG. 2).

At step 304, the virtual sensor module correlates various parameters within the received data, and develop templates for each sensor parameter such as, for example, the temperature sensor in a chiller outlet. As explained above, each sensor parameter is characterized individually (e.g., chiller temperature as a function of load and ambient temperature) to create a generic model framework (i.e., template) that can be used to determine (and predict) data center parameters. In an exemplary embodiment, the virtual sensor module can learn and create an expected form of temperature for the temperature sensor based on the template(s) using a non-linear multi-order regression or an adaptive neural network. Thus, in a situation in which a data center sensor, such as the temperature sensor, fails, a developed temperature template can be used to create temperature data points. It should be note that in a typical data center sensor system, when a sensor fails the system fails. Thus, by creating a generic model framework or template(s) for data center parameters, missing sensor data due to, for example, faulty sensors can be generated based on the template thereby allowing the data center to continue operating.

According to an embodiment, in case of a faulty sensor (e.g., temperature, pressure, or flow sensor) the data center management system activates the virtual sensor module which estimate and generate values for the faulty sensors. For example, for a faulty air supply temperature sensor, the virtual sensor module estimates temperature values based on the following equation:

$$\text{Expected\_Sensor\_value}(t) = a(t) * \text{available temp sens}(t-1) + b(t) * \text{availabletemp\_sens}(t-1)$$

The virtual sensor module operates according to parameter models developed based on design values, built conditions, historical data, coefficients, etc. obtained using short and long term values. Additionally, the virtual sensor module provides a virtual degradation form that allows computing system degradation for the entire data center based on virtually characterized sensor models.

At step 306, the virtual sensor module feeds expected sensor values to a power utilization computation module (e.g., power utilization computation module 208 in FIG. 2), where at step 308 the power utilization effectiveness (PUE) is computed for the data center. As described above, the power utilization effectiveness (PUE) represents an amount of energy used by the data center. Data center operators are generally concerned about the (partial or total) amount of energy used and associated losses. According to an embodiment, the power utilization effectiveness of the data center facility is calculated using the following equation:

$$\text{Power utilization effectiveness(PUE) at time } t \text{ (sec)} = a_1 * \text{sum of all the powers coming into system} + a_2 * \text{losses of all the systems} + a_3 * \text{deviations from performance of each system} + a_4 * \text{load} + a_5 * \text{system degradation} + a_6 * \text{system health score}$$

where, $a_1, a_2, a_3, a_4, a_5, a_5$ are system parameters computed after characterizing the system for a given environment using cognitive models.

sum of all the powers coming into system may include, for example, chiller power, UPS battery power, PAC power, etc.

losses of all the systems may include, for example, loss_chiller, loss_upsbattery, loss_pac, loss_dg_set, etc.

deviations from performance of each system may include, for example, deviations from pre-defined standard patterns.

load may include, for example, heat generated from data center racks.

system degradation and system health score from, for example, system degradation form.

After computing the power utilization effectiveness (i.e., energy consumed by the data center) at step 308, the process continues at step 310 by invoking a dynamic design of experiments engine (e.g., dynamic design of experiments engine 210 in FIG. 2) to generate possible combinations of data center parameters. According to an embodiment, the combinations are generated based on the following equation:

Flexible design of experiments(DOE) at given time instance=$b_1$*[min/max/median values of UPS battery]+$b_2$*(Remaining Useful Life of battery)+$b_3$*(battery state low charge, battery state high charge)+$b_4$*(data center health score)+$b_5$*(loss function derived)+$b_6$*(loads at given point of time)+$b_7$*(ambient temperature,dew point, humidity)+$b_8$*(water set point)+$b_9$*(pump degradation factor,chiller degradation factor,PAC degradation factor,fan degradation)+$b_{10}$*(air fan set point,temperature set points)+$b_{11}$*(past performance score)

where, $b_1$, $b_2$, $b_3$, $b_4$, $b_5$, $b_6$, $b_7$, $b_8$, $b_9$, $b_{10}$ are system parameters computed after characterizing the system for a given environment using cognitive models.

After generating the possible combinations of measured and derived data center parameters for difference scenarios the process continues at step 312 in which the dynamic design of experiments (DOE) is implemented and run. In an embodiment, the generated combinations of measured and derived data center parameters may include, but are not limited to, combinations of system degradations, combinations of losses, combinations of loads, and the like.

At step 314, a dynamic optimization engine, such as the dynamic optimization engine 212 in FIG. 2, is implemented and run to compute an optimal value of power utilization total, an optimal value of power utilization incentives, and an optimal value of power utilization misses. Based on the computed optimal values, the dynamic optimization engine calculates optimal operation parameters for the data center based on a curve of power utilization incentives versus power utilization misses. According to an embodiment, optimization calculations are based on the following equations:

Power utilization total=Power utilization effectiveness(PUE) at time $t$(sec)

Power utilization miss=Power utilization total actual–power utilization predicted–power utilization where actual values are missed+power utilization where performance was higher than expected Power utilization incentive=power utilization total+power utilization where performance was at peak–power utilization number of misses–power utilization miss with final objective functions calculated as:

Min{$c_1(t)$*Power utilization total($t$)+$c_2(t)$*Power utilization miss($t$)+$c_3(t)$*(1/Power utilization incentive($t$)}

Min[Power utilization penalty]=$d_1(t)$*[Power utilization total($t$)]–$d_2(t)$[Power utilization Service Level Agreement($t$)]+$d_3(t)$ Max[expected Power utilization incentive($t$)/expected Power utilization miss($t$)]

where, $c_1$, $c_2$, $c_3$, $d_1$, $d_2$, $d_3$ are system parameters computed after characterizing the system for a given environment using cognitive models.

Accordingly, embodiments of the present invention drive or manage data center operations through the generated curve of power utilization incentives versus power utilization misses. Thus, data center operational parameters are calibrated based on the determined power utilization incentive versus power utilization misses curve. Unlike typical methods for calculating energy usage in which energy efficiency and consumption parameters, simulation runs, parameters optimization, and energy usage control are conducted by regulating a control system.

At step 316, a data frame of predictive PUE values at various loads and power utilization incentive probabilities is created to enhance predictive capabilities of the proposed system and method. Then, at step 318, a check is performed to verify whether data center operations remain on pre-calibrated power utilization incentive versus power utilization misses curve or not. It should be noted that the pre-calibrated values of power utilization incentive and power utilization misses refers to those values previously calculated in steps 304 to 314. Based on data center operations not being on the pre-calibrated power utilization incentive versus power utilization misses curve, the process returns to step 310 in which operational parameters are adjusted based on historical as well as current data center information.

In response to the data center operations being on the pre-calibrated power utilization incentive versus power utilization misses curve, the process continues at step 320 where a user interface input screen (not shown) and control knobs (not shown) are activated to maintain the lowest computed value of PUE misses/PUE incentives. In an exemplary embodiment, temperature and set points are primary control knobs which together with flow rate and differential pressure control knobs can be adjusted to regulate (or adjust) system performance.

According to an embodiment, when data center operations deviate from the estimated optimal power utilization incentive versus power utilization misses curve, the dynamic design of experiments engine recomputes parameter levels and generates another curve of power utilization incentive versus power utilization misses that is used to regulate the data center operations. As information is fed back and system operations are recalibrated based on the new power utilization incentive versus power utilization misses curve, the proposed system can learn from past and current data center information becoming a cognitive system for calculation and optimization of energy usage in data center facilities. Specifically, machine learning tools can be implemented in steps 310 through 318 to refine pattern identification and data processing such that the proposed system becomes capable of anticipating new problems and model possible solutions.

Therefore, embodiment of the present disclosure are capable of substantially reducing potential energy penalties by modeling loss, operational delta, environmental and load scenarios of data centers in real-time without relying on fixed variables and observations. Instead, the proposed method and associated system is based on a real-time dynamic estimation (and prediction) of data center parameters for PUE calculation and optimization. Consequently, an amount and probability of energy penalties that the data center may experience can be estimated based on current or future operational conditions. Finally, the proposed method and associated system is capable of predicting, maximizing and recommending PUE incentives for different data center facilities at different loads under various operating scenarios or conditions.

Figure 4:
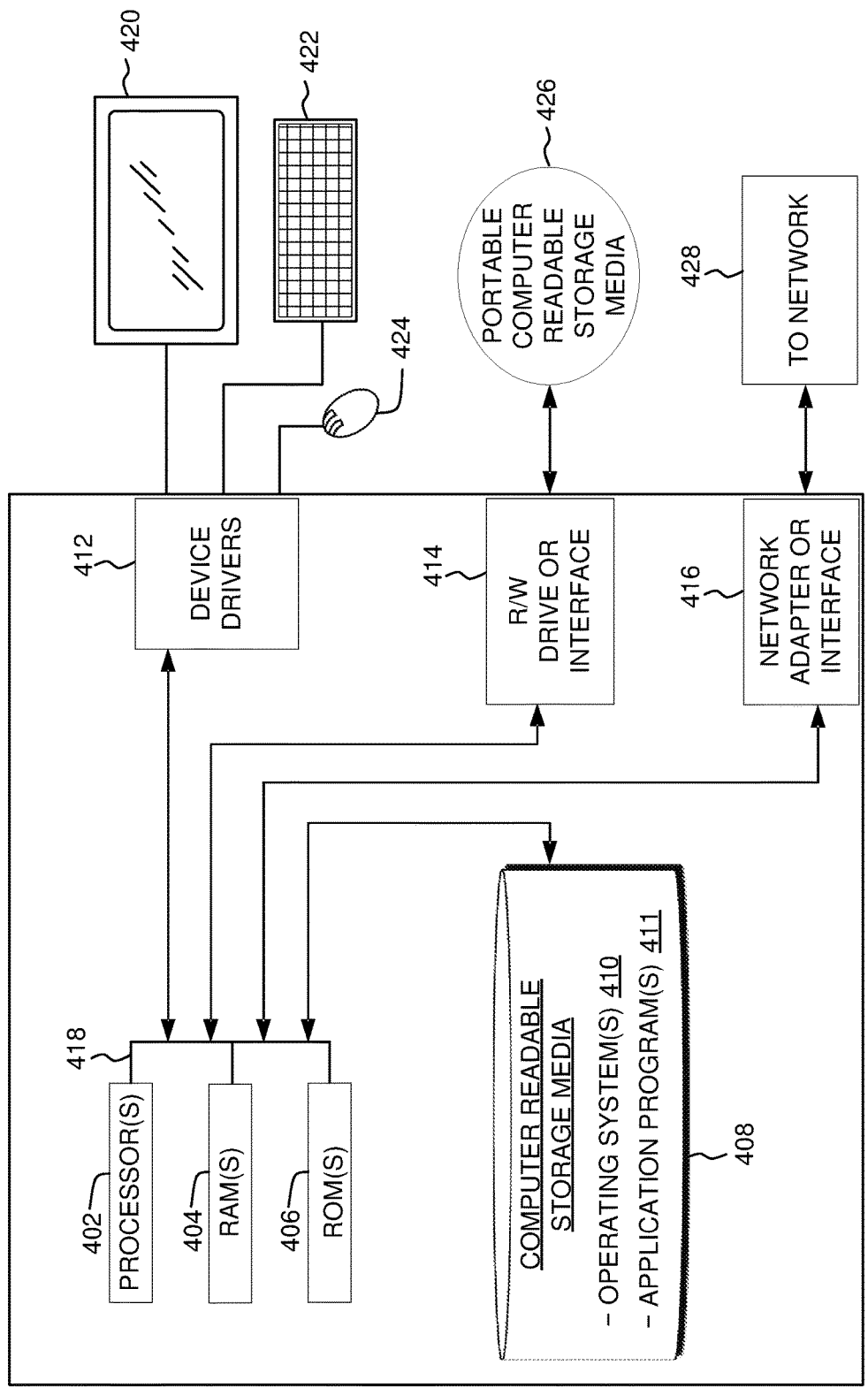
FIG. 4 is a block diagram of internal and external components of a computer system, according to an embodiment of the present disclosure.

Referring now to FIG. 4, a block diagram of components of server computer 102 and client computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Server computer 102 and client computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server computer 102 and client computer 114 may also include a R/W drive or interface 414 to read from and write to one or more portable computer readable storage media 426. Application programs 411 on server computer 102 and client computer 114 may be stored on one or more of the portable computer readable storage media 426, read via the respective R/W drive or interface 414 and loaded into the respective computer readable storage media 408.

Server computer 102 and client computer 114 may also include a network adapter or interface 416, such as a TCP/IP adapter card or wireless communication adapter (such as a 4G wireless communication adapter using OFDMA technology) for connection to a network 428. Application programs 411 on server computer 102 and client computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server computer 102 and client computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
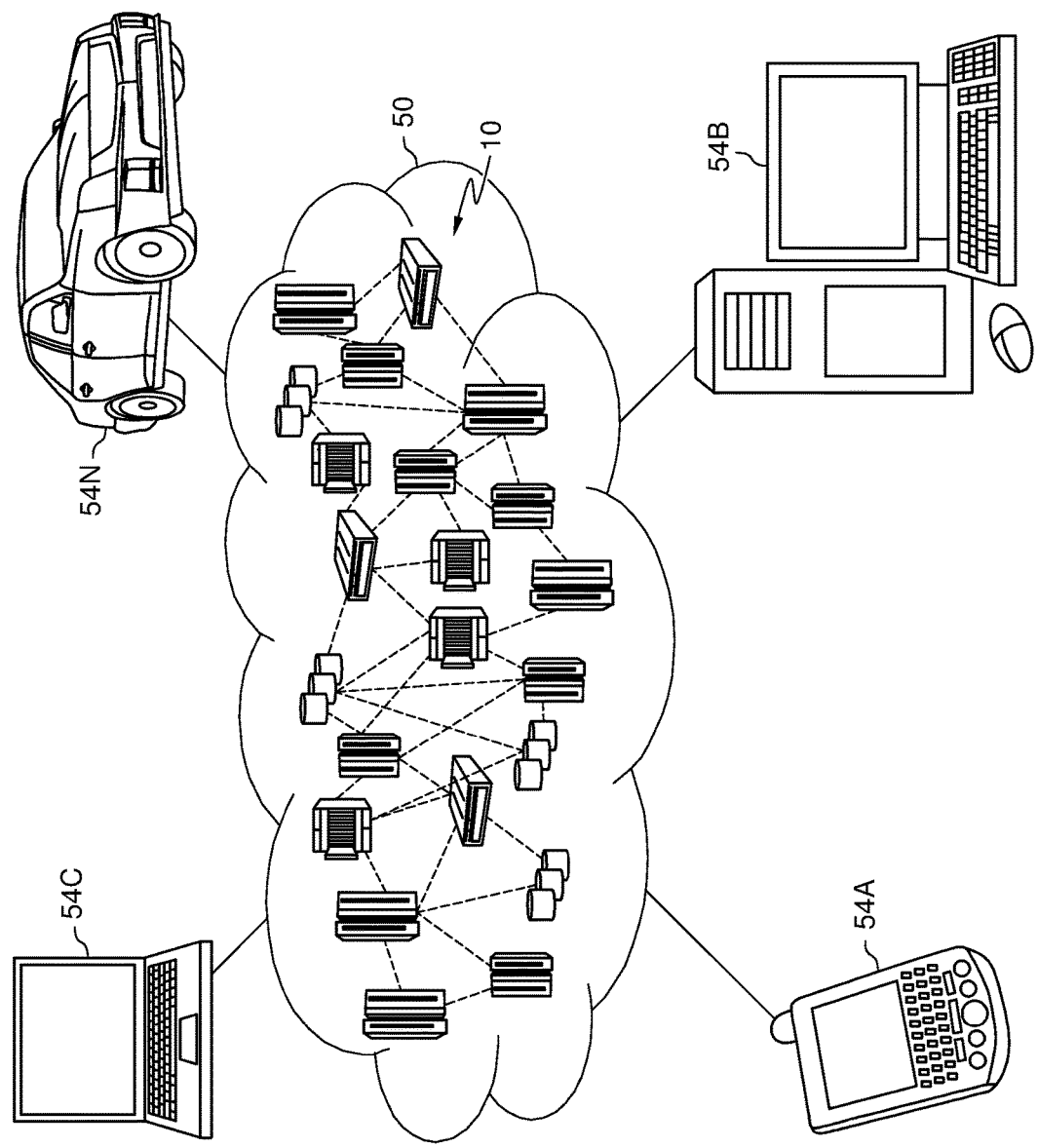
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
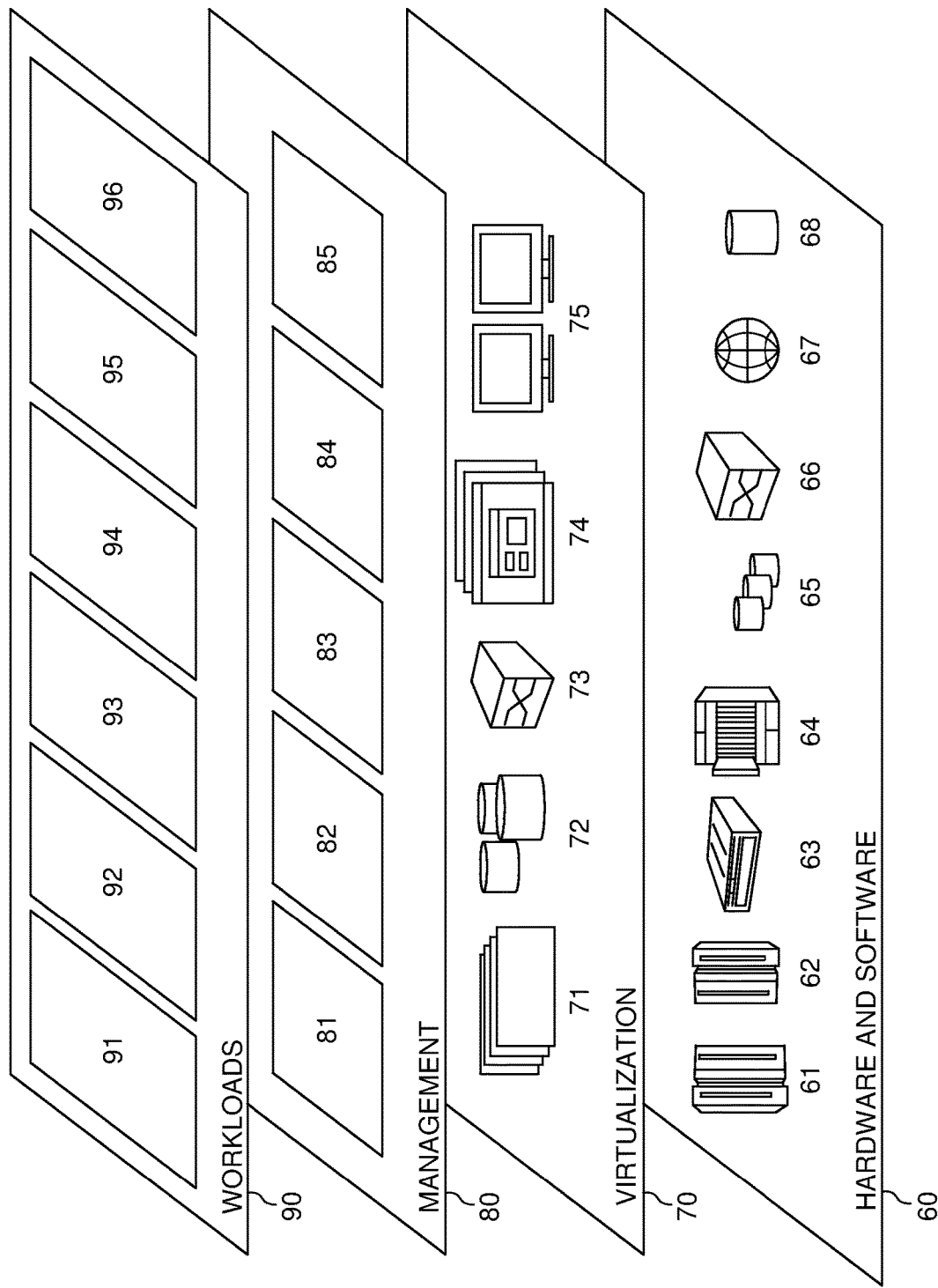
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for calculating and optimizing PUE 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for calculating power usage effectiveness in a data center, the method comprising:
based on a historical data of the data center, generating, by one or more processors, a template for each data center parameter of a plurality of data center parameters;
calculating, by the one or more processors, an expected value of each data center parameter based on the generated template; and
based on the expected value of each data center parameter, computing, by the one or more processors, a power usage effectiveness associated with the data center.

2. The method of claim 1, further comprising:
receiving, by the one or more processors, data corresponding to a plurality of sensors in the data center; and
based on the received data, identifying, by the one or more processors, the plurality of data center parameters.

3. The method of claim 1, further comprising:
based on a dynamic design of experiments, generating, by the one or more processors, an optimal number of possible combinations of the plurality of data center parameters for various operating scenarios.

4. The method of claim 3, wherein the generated optimal number of possible combinations comprises possible combinations of system degradations, possible combinations of losses, and possible combinations of loads.

5. The method of claim 1, further comprising:
computing, by the one or more processors, an optimal value of power utilization total, an optimal value of power utilization incentives, and an optimal value of power utilization misses; and
based on the computed optimal value of power utilization total, optimal value of power utilization incentives, and optimal value of power utilization misses, generating, by the one or more processors, a curve of power utilization incentives versus power utilization misses; and
based on the generated curve of power utilization incentives versus power utilization misses, determining, by the one or more processors, optimal operation parameters for the data center.

6. The method of claim 5, further comprising:
calibrating, by the one or more processors, the plurality of data center parameters based on the determined optimal operation parameters for the data center.

7. The method of claim 6, further comprising:
displaying a user interface input screen and control knobs to maintain the determined optimal operation parameters for the data center.

8. A computer system for calculating power usage effectiveness in a data center, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
based on a historical data of the data center, generating, by one or more processors, a template for each data center parameter of a plurality of data center parameters;
calculating, by the one or more processors, an expected value of each data center parameter based on the generated template; and
based on the expected value of each data center parameter, computing, by the one or more processors, a power usage effectiveness associated with the data center.

9. The computer system of claim 8, further comprising:
receiving, by the one or more processors, data corresponding to a plurality of sensors in the data center; and
based on the received data, identifying, by the one or more processors, the plurality of data center parameters.

10. The computer system of claim 8, further comprising:
based on a dynamic design of experiments, generating, by the one or more processors, an optimal number of possible combinations of the plurality of data center parameters for various operating scenarios.

11. The computer system of claim 10, wherein the generated optimal number of possible combinations comprises possible combinations of system degradations, possible combinations of losses, and possible combinations of loads.

12. The computer system of claim 8, further comprising:
computing, by the one or more processors, an optimal value of power utilization total, an optimal value of power utilization incentives, and an optimal value of power utilization misses; and
based on the computed optimal value of power utilization total, optimal value of power utilization incentives, and optimal value of power utilization misses, generating, by the one or more processors, a curve of power utilization incentives versus power utilization misses; and
based on the generated curve of power utilization incentives versus power utilization misses, determining, by the one or more processors, optimal operation parameters for the data center.

13. The computer system of claim 12, further comprising:
calibrating, by the one or more processors, the plurality of data center parameters based on the determined optimal operation parameters for the data center.

14. The computer system of claim 13, further comprising:
displaying a user interface input screen and control knobs to maintain the determined optimal operation parameters for the data center.

15. A computer program product for calculating power usage effectiveness in a data center, the computer program product comprising:
a computer readable storage medium having program instructions embodied therewith, wherein the computer readable storage medium is not a transitory signal per se, the program instructions executable by a device to cause the device to perform a method comprising:
based on a historical data of the data center, generating, by one or more processors, a template for each data center parameter of a plurality of data center parameters;
calculating, by the one or more processors, an expected value of each data center parameter based on the generated template; and
based on the expected value of each data center parameter, computing, by the one or more processors, a power usage effectiveness associated with the data center.

16. The computer program product of claim 15, further comprising:
  receiving, by the one or more processors, data corresponding to a plurality of sensors in the data center; and
  based on the received data, identifying, by the one or more processors, the plurality of data center parameters.

17. The computer program product of claim 15, further comprising:
  based on a dynamic design of experiments, generating, by the one or more processors, an optimal number of possible combinations of the plurality of data center parameters for various operating scenarios.

18. The computer program product of claim 17, wherein the generated optimal number of possible combinations comprises possible combinations of system degradations, possible combinations of losses, possible combinations of loads.

19. The computer program product of claim 15, further comprising:
  computing, by the one or more processors, an optimal value of power utilization total, an optimal value of power utilization incentives, and an optimal value of power utilization misses; and
  based on the computed optimal value of power utilization total, optimal value of power utilization incentives, and optimal value of power utilization misses, generating, by the one or more processors, a curve of power utilization incentives versus power utilization misses; and
  based on the generated curve of power utilization incentives versus power utilization misses, determining, by the one or more processors, optimal operation parameters for the data center.

20. The computer program product of claim 19, further comprising:
  calibrating, by the one or more processors, the plurality of data center parameters based on the determined optimal operation parameters for the data center; and
  displaying a user interface input screen and control knobs to maintain the determined optimal operation parameters for the data center.

\* \* \* \* \*